(12) United States Patent  (10) Patent No.: US 8,384,838 B2
Sugawara et al.  (45) Date of Patent: Feb. 26, 2013

(54) LIQUID CRYSTAL DISPLAY WITH FRAMED BACKLIGHT UNIT HAVING FIXING MEMBER

(75) Inventors: Hideaki Sugawara, Kanagawa (JP); Yasushi Takada, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 676 days.

(21) Appl. No.: 12/109,532

(22) Filed: Apr. 25, 2008

(65) Prior Publication Data

US 2008/0273139 A1  Nov. 6, 2008

(30) Foreign Application Priority Data

May 2, 2007  (JP) ................................ 2007-121823

(51) Int. Cl.
 G02F 1/1333 (2006.01)
 G02F 1/1335 (2006.01)
 G01D 11/28 (2006.01)
 F21V 7/04 (2006.01)

(52) U.S. Cl. ............. 349/58; 349/61; 349/62; 349/64; 349/67; 349/69; 361/704; 362/27; 362/29; 362/30; 362/609; 362/615

(58) Field of Classification Search ............... 349/58, 349/61–62, 64, 67, 69–70; 361/70, 697.21, 361/697.28; 362/27, 29, 30, 97.2, 609, 614–615
See application file for complete search history.

(56) References Cited

U.S. PATENT DOCUMENTS

| 5,835,139 | A  |   | 11/1998 | Yun et al. |
| 6,064,565 | A  | * | 5/2000  | Ishihara et al. ........... 361/679.27 |
| 6,424,391 | B1 | * | 7/2002  | Tsukamoto et al. ............ 349/58 |
| 6,636,282 | B2 |   | 10/2003 | Ogawa et al. |
| 6,806,920 | B2 | * | 10/2004 | Hayashi et al. ................. 349/58 |
| 6,885,411 | B2 |   | 4/2005  | Ogawa et al. |
| 7,120,010 | B2 | * | 10/2006 | Tajima ..................... 361/679.21 |

(Continued)

FOREIGN PATENT DOCUMENTS

| JP | 2001-311940 | 11/2001 |
| JP | 2002-023140 | 1/2002 |

(Continued)

OTHER PUBLICATIONS

Chinese Office Action mailed Mar. 22, 2011 in corresponding Chinese Application No. 200810092813.2 with English translation of Chinese Office Action.

(Continued)

*Primary Examiner* — Hoan C Nguyen

(74) *Attorney, Agent, or Firm* — Young & Thompson

(57) ABSTRACT

A liquid crystal display device is provided, capable of minimizing deterioration in display quality of a liquid crystal panel due to external force generated by connection with an external chassis such as a customer's chassis. The liquid crystal display device has, at least, a front frame, a liquid crystal panel, and a backlight unit having at least a rear frame, arranged in this order. A back fixing frame to be fixed to the front frame is provided on the back face of the liquid crystal display device, and attachment portions to be attached to an external chassis are provided in the back fixing frame. This makes it difficult for external force generated by connection with the external chassis to be transmitted to the liquid crystal panel or the backlight unit, suppresses deformation of the liquid crystal panel or reflection sheet and prevents deterioration in display quality.

18 Claims, 12 Drawing Sheets

U.S. PATENT DOCUMENTS

| | | |
|---|---|---|
| 7,190,423 B2 | 3/2007 | Sugawara et al. |
| 2002/0008804 A1 | 1/2002 | Ogawa et al. |
| 2003/0234895 A1* | 12/2003 | Sugawara et al. ............... 349/58 |
| 2004/0085491 A1 | 5/2004 | Ogawa et al. |
| 2005/0052587 A1 | 3/2005 | Kitada et al. |
| 2008/0079864 A1* | 4/2008 | Nishimura ...................... 349/58 |

FOREIGN PATENT DOCUMENTS

| | | |
|---|---|---|
| JP | 2003-295789 | 10/2003 |
| JP | 2004-029186 | 1/2004 |
| JP | 2005-156575 | 6/2005 |
| JP | 2006-058587 | 3/2006 |
| JP | 2006-065139 | 3/2006 |
| KR | 20030043231 | 6/2003 |
| TW | 274939 | 3/2007 |

OTHER PUBLICATIONS

Japanese Official Action—2007-121823—Dec. 28, 2011.
JP Office Action dated Aug. 24, 2012, Application No. 2007-121823.

* cited by examiner

LIQUID CRYSTAL DISPLAY WITH FRAMED BACKLIGHT UNIT HAVING FIXING MEMBER

This application is based upon and claims the benefit of priority from Japanese patent application No. 2007-121823, filed on May 2, 2007, the disclosure of which is incorporated herein in its entirety by reference.

BACKGROUND OF THE INVENTION

1. Field of the Invention

The present invention relates to a liquid crystal display device.

2. Description of the Related Art

Liquid crystal display devices are widely used as display devices in AV or OA equipment, for their advantages such as low profile, light weight and low power consumption. Such a liquid crystal display device is shown in FIG. 13. A liquid crystal display device 101 is composed of a liquid crystal panel 103 having liquid crystal sandwiched between a pair of opposing substrates and a tape carrier package (TCP) connected to the periphery of the panel, a backlight unit 104 in which a light source for illuminating the liquid crystal panel 103 is held by a backlight chassis and a rear frame, and a front frame 102 attached from the display screen side of the liquid crystal panel 103 and fixed to the backlight unit 104 (see, for example, Japanese Patent No. 3296993, and Japanese Unexamined Patent Publication No. 2003-295789).

The liquid crystal display device 101 is attached to a customer's chassis to be incorporated in customer's equipment. When the liquid crystal display device is attached to the customer's chassis at a side face thereof, as shown in FIG. 14, a threaded attachment portion 114 is provided in a backlight chassis 107 or rear frame 106 forming the backlight unit 104 to fix the liquid crystal display device to the customer's chassis. Whereas when the liquid crystal display device is attached to the customer's chassis at the back face thereof, a threaded attachment portion 115 is provided in the rear frame 106 to fix the liquid crystal display device to the customer's chassis.

SUMMARY OF THE INVENTION

In the conventional liquid crystal display device as described above, the attachment portion 114 or 115 is provided in the backlight chassis 107 or rear frame 106 forming the backlight unit in order to attach the liquid crystal display device to a customer's chassis. According to this configuration, however, external force is apt to be generated due to attachment tolerance or the like between the liquid crystal display device and an object to which it is attached (e.g. a customer's chassis) and such external force is apt to bend, twist, or otherwise deform the liquid crystal display device. If the rigidity of the liquid crystal display device itself is low, this external force will deform the liquid crystal panel as well, and such deformation of the liquid crystal panel deteriorates the display quality.

Specifically, when the attachment portion 114 is provided in a side face of the liquid crystal display device 101 as shown in FIG. 14, deformation occurs in the backlight chassis 107 and the rear frame 106 when a screw is inserted into the attachment portion 114, and this deformation is transmitted to the liquid crystal panel 103 to deform the liquid crystal panel 103, resulting in deterioration in the display quality.

When the attachment portion 115 is provided in the back face of the liquid crystal display device 101, deformation occurring in the rear frame 106 when a screw is inserted into the attachment portion 115 is transmitted to a reflection sheet 111 arranged inside the rear frame 106, deteriorating the flatness of the reflection sheet 111. This deterioration in flatness of the reflection sheet 111 adversely affects the luminance uniformity of the backlight unit, resulting in deterioration in display quality of the liquid crystal panel 103.

The present invention has been made in view of the problems as described above, and it is a principal object of the present invention to provide a liquid crystal display device which is capable of minimizing the deterioration in display quality of a liquid crystal panel due to external force generated by connection with an external chassis such as a customer's chassis.

In order to achieve the object above, the present invention provides a liquid crystal display device having, at least, a front frame, a liquid crystal panel, and a backlight unit having at least a rear frame, arranged in this sequence. A back fixing member to be fixed to the front frame is provided on the back face of the liquid crystal display device, and the back fixing member is provided with an attachment portion to be attached to an external chassis.

Further, the present invention provides a liquid crystal display device having, at least, a liquid crystal panel, a backlight unit having a light source between a backlight chassis and a rear frame, and a front frame mounted from the display screen side of the liquid crystal panel and connected with the backlight unit. A back fixing member is provided on the back face of the liquid crystal display device so that the back fixing member is fixed to the front frame and covers at least a part of the back face and side faces of the liquid crystal display device, and a attachment portion is provided in at least either the side faces or the back face of the back fixing member to be attached to an external chassis.

A liquid crystal display device according to the present invention is capable of improving such deterioration in display quality of the liquid crystal panel as found in the conventional panel.

BRIEF DESCRIPTION OF THE DRAWINGS

FIG. 1 is also related to a third, a fourth, a eighth, and a fourteenth exemplary embodiment;

DETAILED DESCRIPTION OF EXEMPLARY EMBODIMENTS

Figure 1:
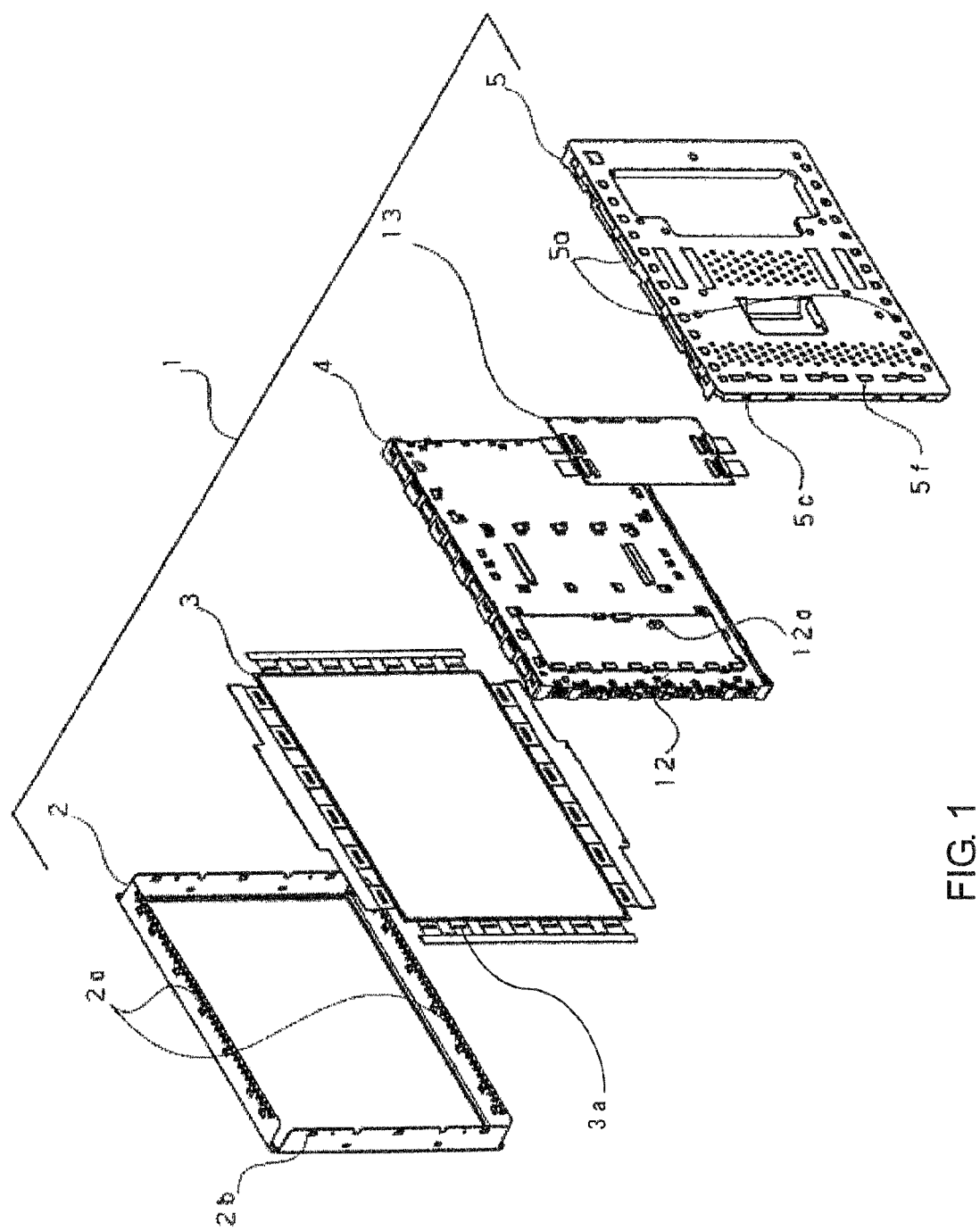
FIG. 1 is an exploded view showing construction of a liquid crystal display device according a first exemplary embodiment of the present invention.

As described in relation to the related art, when a liquid crystal display device, which is composed of a front frame, a liquid crystal panel, and a backlight unit, is provided with a attachment portion for fixing the liquid crystal display device to a customer's chassis, such a attachment portion is provided by a threaded hole which is formed in the front frame or a backlight chassis or rear frame forming the backlight unit. This entails a problem that a liquid crystal panel and a reflection sheet are apt to be deformed by external force exerted from the customer's chassis, resulting in deterioration in display quality.

This problem is attributable to the structure in which the customer's chassis is directly fixed to the chassis holding and fixing the liquid crystal panel and the reflection sheet. According to the present invention, a back fixing frame is further provided in addition to the front frame, backlight chassis, and rear frame, on the back side of the liquid crystal display device, so that the back fixing frame is fixed to the customer's chassis.

This back fixing frame covers the back face of the liquid crystal display device composed of a front frame, a liquid crystal panel, and a backlight unit, and is fixed to the front frame and/or the backlight unit by means of fitting, clamping with a screw, bonding with an adhesive material, or other mechanical connecting means. Further, the back fixing frame is provided with an attachment portion for fixing the liquid crystal display device including the back fixing frame.

According to the present invention, the back fixing frame and at least one of the front frame, the backlight chassis and the rear frame are respectively provided with fitting portions fitting with each other or abutting portions engaging with each other, so that the back fixing frame can be positioned by means of the fitting portions or abutting portions.

The addition of the back fixing frame makes it difficult for external force exerted from a customer's chassis to be transmitted to the liquid crystal panel or the reflection sheet. Accordingly, deterioration of the display quality due to deformation of the liquid crystal panel or reflection sheet can be prevented.

TCPs or other components for inputting an electric signal to the liquid crystal panel are disposed on a side face of the liquid crystal display device. When the attachment portion is provided on this side face, the attachment portion must be disposed between the TCPs. When the attachment portion is provided on a side face of the back fixing frame, in contrast, the attachment portion can be arranged at a position not overlapped with other components such as the backlight unit or TCPs in a depth direction so that the attachment portion is not affected by the arrangement of these components. This makes it possible to reduce the restrictions when assembling the liquid crystal display device. Further, when the attachment portion is provided on the back face of the liquid crystal display device as well, the attachment portion can be disposed in the back fixing frame on the back face of the liquid crystal display device so that the arrangement of the attachment portion is not affected by the arrangement of other components. This likewise makes it possible to reduce the restrictions when assembling the liquid crystal display device.

Further, the front frame and the backlight chassis and rear frame forming the backlight unit contribute to the rigidity of the liquid crystal display device, and this rigidity of the liquid crystal display device can be improved further by mechanically connecting the back fixing frame to these components. In addition, as a result of the mechanical connection of the back fixing frame with the front frame, the liquid crystal display device assumes a box-like shape as a whole, which further improves the rigidity of the liquid crystal display device. When external force which may deform the liquid crystal display device is exerted to the liquid crystal display device, stress will concentrate at the four corners of the front frame. However, the connection between the front frame and the back fixing frame makes an integrated shape, whereby the rigidity at the four corners can be enhanced.

When the back fixing frame is formed of a metal, a signal processing board provided on the rear frame to input electric signals to the liquid crystal panel can be reliably shielded from external electromagnetic waves by the back fixing frame covering the same. Thus, the EMI performance of the liquid crystal display device can be improved.

A heat generating component in the backlight unit can be disposed in contact with the back fixing frame with a heat conductive material interposed therebetween, or a circuit board including a heat generating component can be fixed to the back fixing frame, so that back fixing frame functions as a heat dissipating plate. As a result, the heat dissipation performance of the liquid crystal display device can be improved. Further, ventilation holes can be provided in upper and lower parts of the front frame and back fixing frame, so that air heated by heat from a lamp within the backlight unit is dissipated through the ventilation holes. This also improves the heat dissipation performance of the liquid crystal display device. When the backlight unit requires heat dissipation due to heat generation by the lamp within the backlight unit, the back fixing frame can be made of a metal and disposed in face contact with the rear frame forming the backlight unit, so that the back fixing frame functions as a heat dissipating plate. This also improves the heat dissipation performance of the liquid crystal display device.

Although the assembling process of the liquid crystal display device becomes more complicated by the addition of the back fixing frame, the assembling sequence of the back fixing frame can be changed easily by forming the back fixing frame to be connectable with the rear frame of the backlight unit. When the back fixing frame is attached to the rear frame first, the back fixing frame can be attached accurately by providing a fitting portion in the front frame and back fixing frame.

Exemplary Embodiment 1

Figure 2:
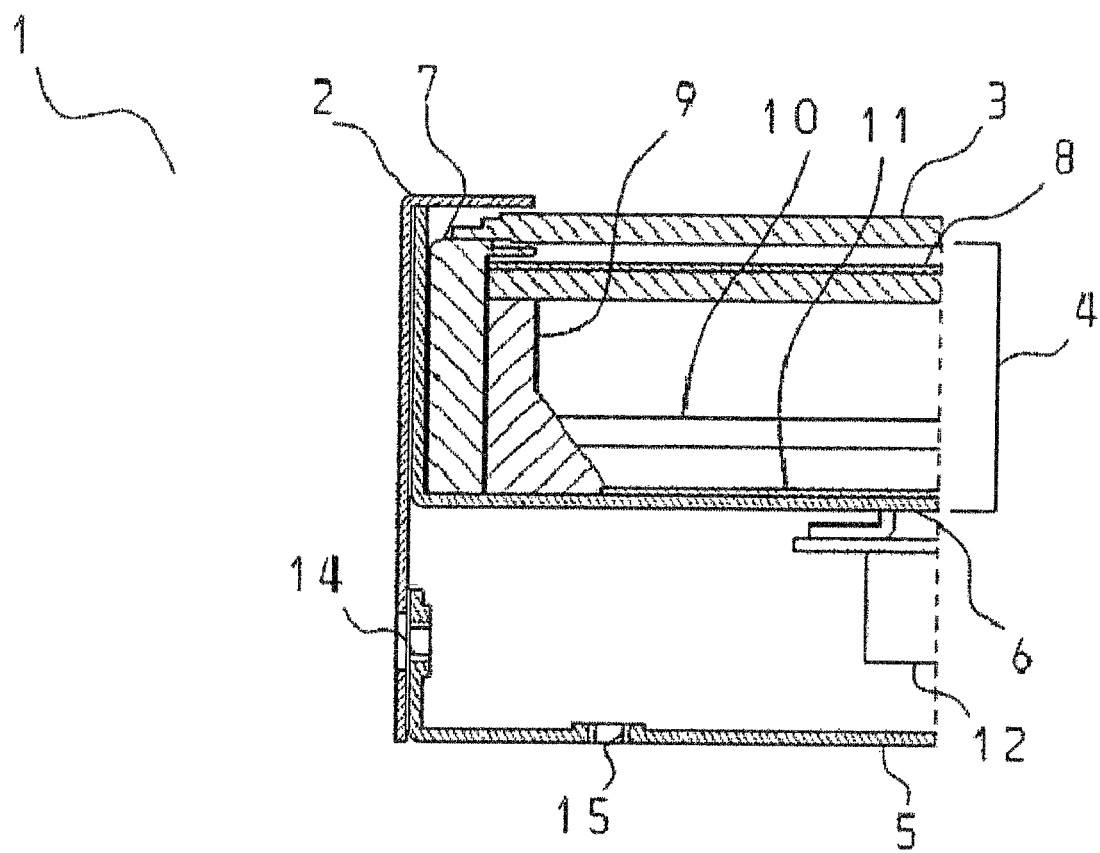
FIG. 2 is a cross-sectional view showing a configuration of an attachment portion of the liquid crystal display device according to the first exemplary embodiment of the present invention.
Figure 3:
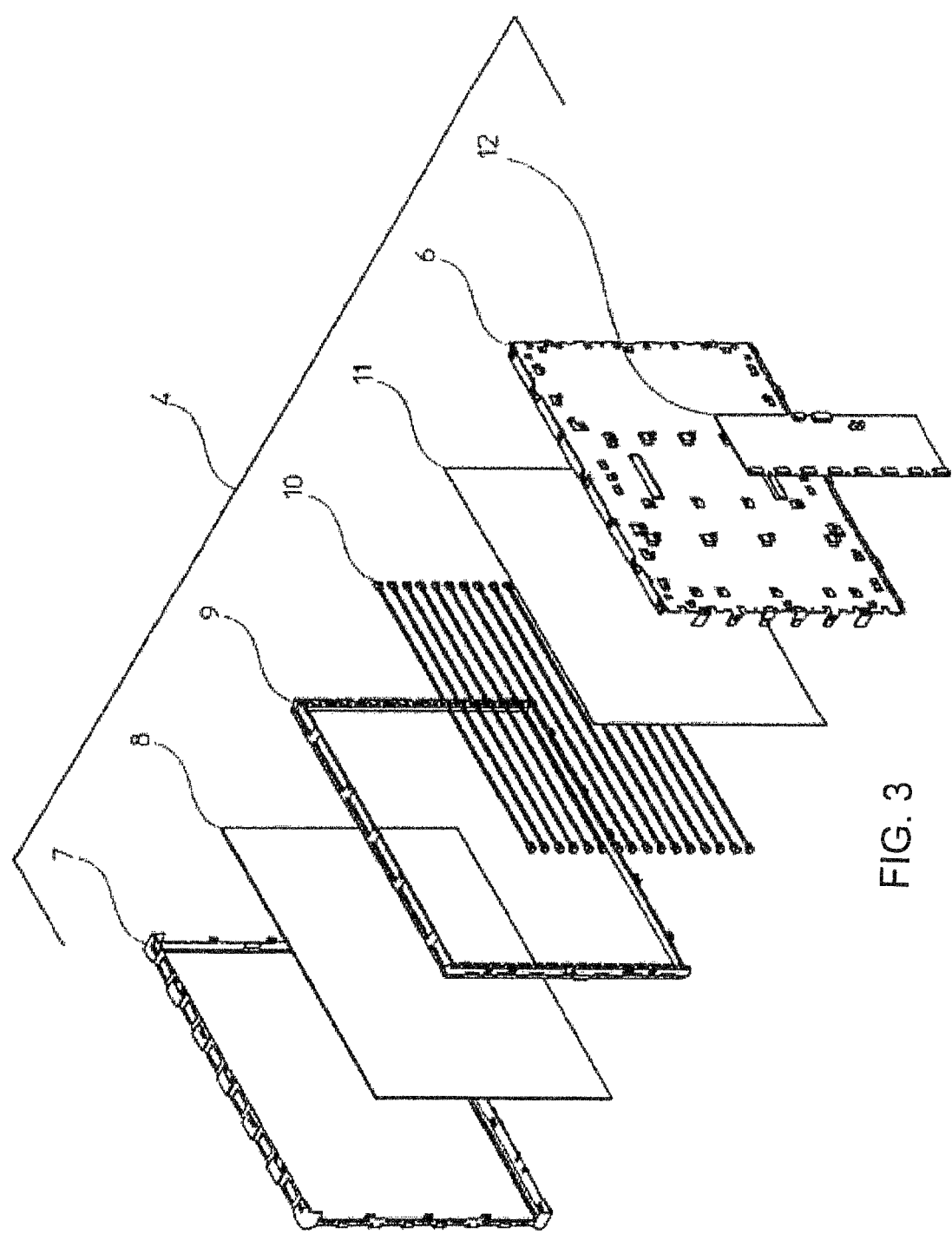
FIG. 3 is an exploded view showing construction of a backlight unit according to the first exemplary embodiment of the present invention.
Figure 4:
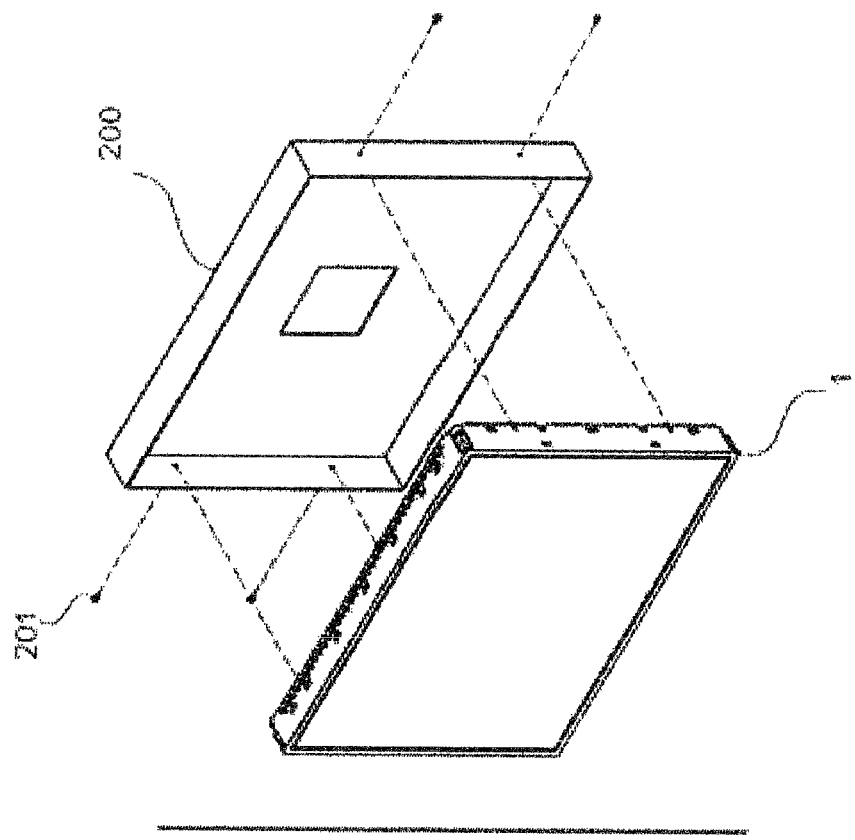
FIG. 4 is an exploded view showing an example of a way in which the liquid crystal display device according to the first exemplary embodiment of the present invention is attached to a customer's chassis.
Figure 4:
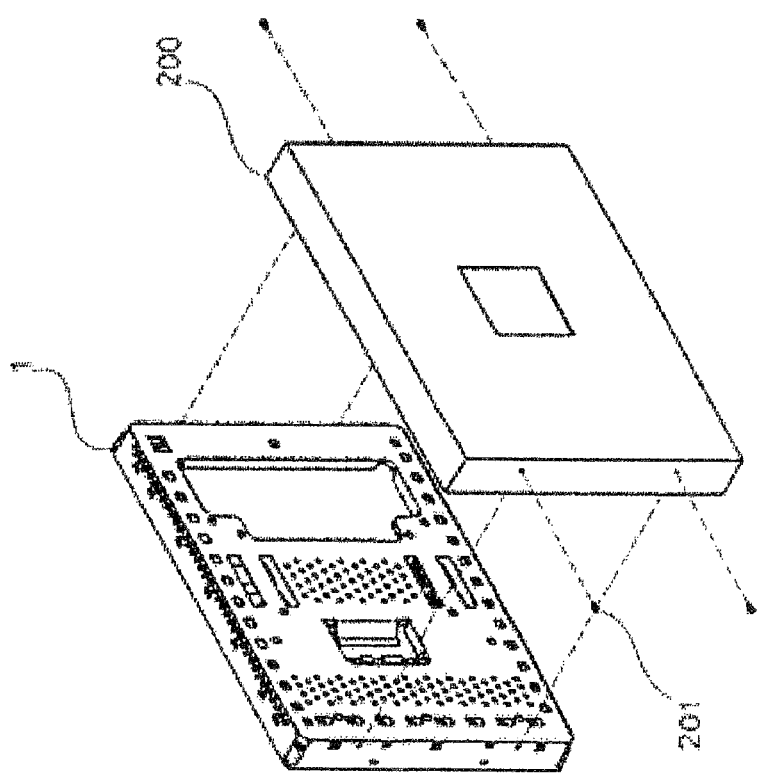

In order to describe the exemplary embodiments of the present invention above in more detail, a liquid crystal display device according to a first exemplary embodiment of the present invention will be described with reference to FIGS. 1 to 4. FIG. 1 is an exploded view showing construction of a liquid crystal display device according to the first exemplary embodiment. FIG. 2 is a cross-sectional view showing a structure of an attachment portion of the liquid crystal display device. FIG. 3 is an exploded view showing construction of a backlight unit of the first exemplary embodiment. FIG. 4 is a diagram showing an example of a way in which the liquid crystal display device according to the first exemplary embodiment of the present invention is attached to a customer's chassis.

As shown in FIG. 1, a liquid crystal display device 1 according to the first exemplary embodiment has, as its principal components, a liquid crystal panel 3, a backlight unit 4 as an auxiliary light source, a chassis part which is attached from the display screen side of the liquid crystal display device to cover the sides of the liquid crystal panel 3 and backlight unit 4 and to hold the entire liquid crystal display device (hereafter referred to as the front frame 2), and another chassis part attached from the back side of the liquid crystal display device 1 (hereafter referred to as the back fixing frame 5).

The liquid crystal panel 3 includes a thin film transistor (TFT) substrate having TFTs or other switching elements formed in matrix thereon, an opposing substrate having a color filter (CF), a black matrix (BM) and other components formed thereon, liquid crystal held between these boards, and a TCP 3a connected to a terminal of one of the substrates.

As shown in FIG. 3, the backlight unit 4 includes a chassis located on the display screen side (hereafter referred to as the backlight chassis 7), an optical sheet 8 such as a lens sheet or deflection sheet, a light source such as a cold cathode fluorescent lamp (CCFL) or a light emitting diode (LED) (a CCFL is employed in this exemplary embodiment), a CCFL support 9 for supporting the CCFL 10, a reflection sheet 11 for reflecting light from the CCFL 10 to the liquid crystal panel 3, a chassis located on the back side (hereafter referred to as the rear frame 6), a backlight inverter 12 for lighting the CCFL 10. The backlight unit 4 is of a direct lighting type in which the outer appearance of the backlight unit 4 is formed by the backlight chassis 7 and the rear frame 6, while the CCFL 10 protected by these members is arranged in the inside of the backlight unit, so that light emitted from the CCFL 10 is applied to the liquid crystal panel 3 through the optical sheet 8 having optical functionality.

The type of light source and the light generation method of the backlight unit 4 are not restricted particularly. A light generation method called "side-light type method" may be employed, in which the backlight unit is composed of a backlight chassis and a rear frame, and light emitted from the CCFL protected by these members is applied to the liquid crystal panel through a light guide plate made of PMMA (polymethylmethacrylate) or other material and an optical sheet having optical functionality.

As shown in FIGS. 1 and 2, the back fixing frame 5 is inserted into the opening of the front frame 2 from the back side of the liquid crystal display device 1 and fixed to the front frame 2 by mechanical connection such as fitting between a plurality of fitting portions 2b and fitting portions 5c provided respectively in the front frame 2 and the back fixing frame 5 or clamping with screws, or pasting with an adhesive material. An attachment portion 14, 15 can be provided at any desired position in the side face or back face of the liquid crystal display device 1 by forming a threaded part at the position of the back fixing frame 5 to fix the liquid crystal display device 1. Further, when the liquid crystal display device 1 is attached to the customer's chassis at its side face, a hole having a diameter larger than that of the threaded hole of the attachment portion 14 provided in the back fixing frame 5 of the front frame 2 is formed at a position overlapping with the attachment portion 14. This enables the threaded portion of the back fixing frame 5 to function as the attachment portion 14.

A sheet metal of aluminum alloy or stainless steel is suitable as a material of the back fixing frame 5, when taking into consideration workability, strength, heat dissipation performance, and EMI performance. However, the material, configuration and manufacturing method of the back fixing frame 5 are not restricted particularly. For example, it may be formed by resin molding or casting, or may be formed by stacking layers of a plurality of materials. The back fixing frame 5 is only required to cover at least a part of the back face and side face of the liquid crystal display device 1. The shape of the back fixing frame 5 is not limited particularly, and may be of a frame shape, a box shape, or a plate shape a part of which is bent.

When the liquid crystal display device 1 configured as described above is fixed to a customer's chassis, as shown in FIG. 4, a customer's chassis 200 is placed over the liquid crystal display device 1 to cover the same, and an liquid crystal display device attachment screw 201 is inserted from the outside of the customer's chassis 200 to pass through the hole in the front frame 2 and screw-engaged with the attachment portion 14 or the like of the back fixing frame 5. Accordingly, in comparison with the prior art in which the liquid crystal display device attachment screw 201 is directly engaged with the front frame 2, the backlight chassis 7, or the rear frame 6, deformation of the liquid crystal panel 3 or the reflection sheet 11 can be reduced, and thus the deterioration in display quality can be prevented. Further, the attachment of the customer's chassis 200 to the back fixing frame 5 eliminates the effect from the arrangement of other components, and hence the restrictions when assembling the liquid crystal display device can be reduced.

The addition of the back fixing frame 5 improves the rigidity and EMI performance of the liquid crystal display device as a whole. Further, the face contact at the screw engagement portion enables heat conduction from the rear frame 6 to the back fixing frame 5, whereby the performance to dissipate the heat generated by the backlight unit 4 can be improved.

Figure 13:
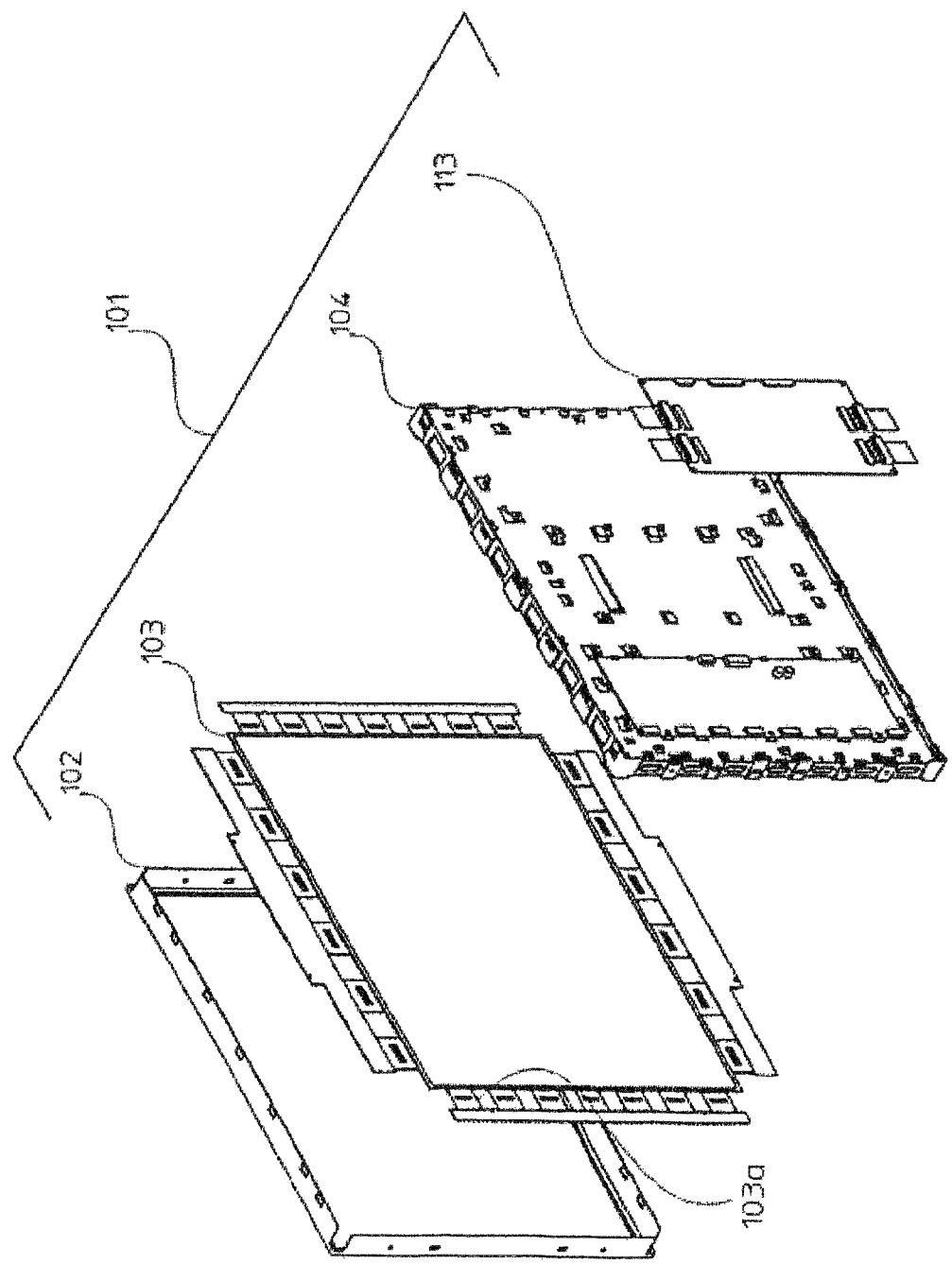
FIG. 13 is an exploded view showing construction of a conventional liquid crystal display device.
Figure 14:
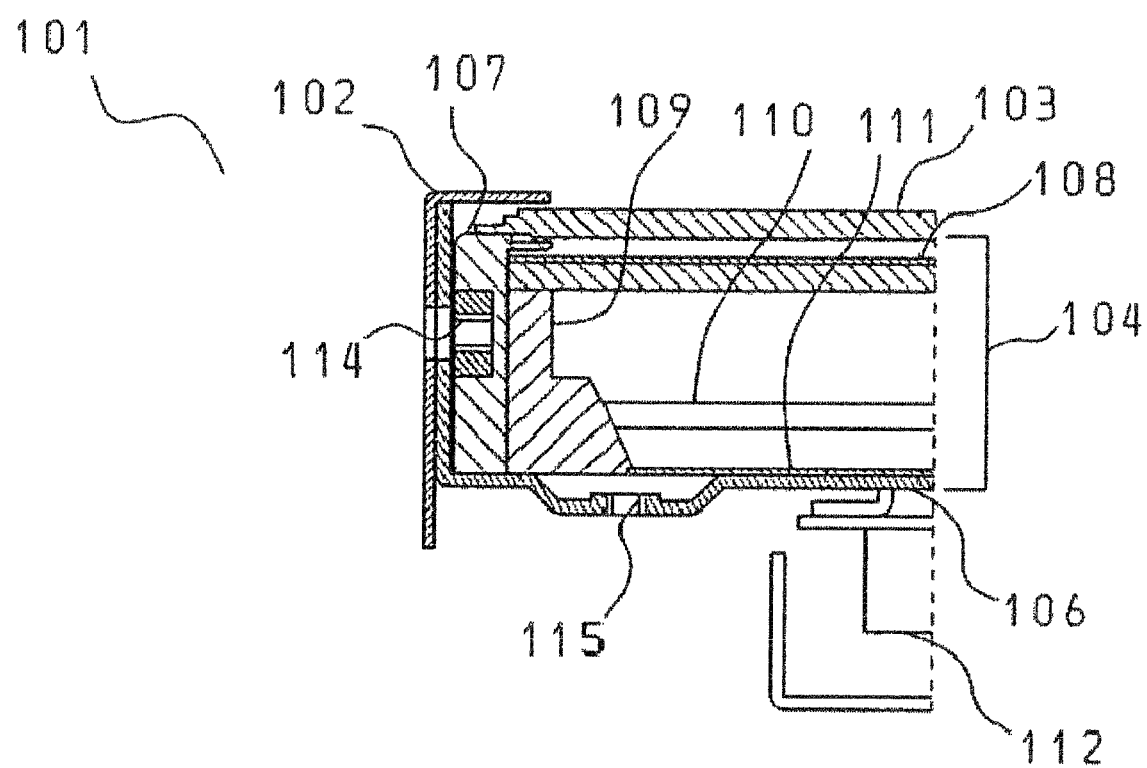
FIG. 14 is a cross-sectional view showing a structure of an attachment portion of the conventional liquid crystal display device.

In a conventional liquid crystal display device 101 as shown in FIGS. 13 and 14, designs of a front frame 102, a rear frame 106 and a backlight chassis 107 need be changed in order to change the position of an attachment portion 114, 115. In the liquid crystal display device 1 of the first exemplary embodiment as shown in FIG. 2, in contrast, design change is required only for the front frame 2 and the back fixing frame 5, and hence the number of components requiring design change can be reduced.

It is noted, incidentally, that some of the drawings related to the first exemplary embodiment are also used in connection with other exemplary embodiments.

Exemplary Embodiment 2

Figure 5:
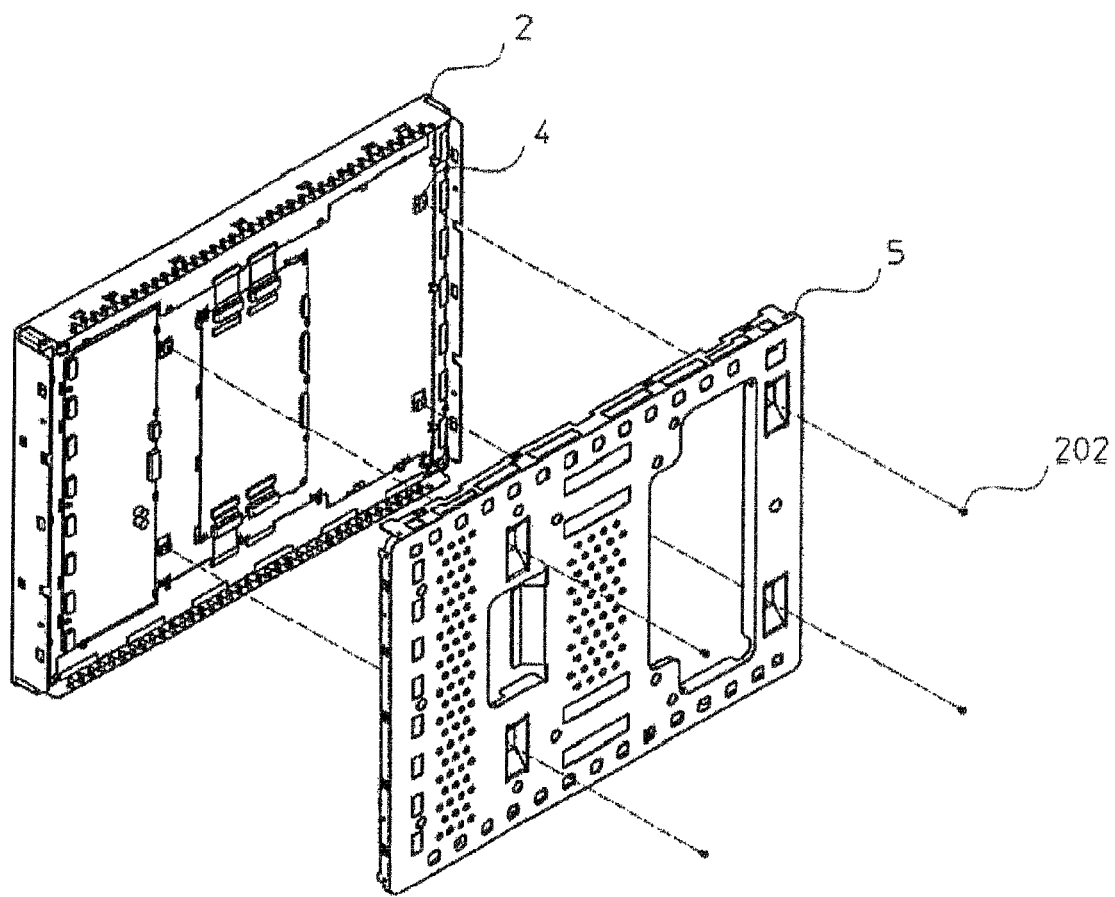
FIG. 5 is an exploded view illustrating an attachment structure of a back fixing frame of the liquid crystal display device according to a second exemplary embodiment of the present invention.

A liquid crystal display device according to a second exemplary embodiment of the present invention will be described with reference to FIG. 5. FIG. 5 is an exploded view showing attachment of a back fixing frame of the liquid crystal display device according to this exemplary embodiment.

Although the back fixing frame 5 is fixed to the front frame 2 in the first exemplary embodiment above, the back fixing frame 5 may be fastened to the rear frame 6 forming the backlight unit 4 with the use of a back fixing frame attachment screw 202, as shown in FIG. 5. Further, the first and second exemplary embodiments may be combined so that the back fixing frame 5 is not only engaged with the front frame 2 but also fastened to the rear frame 6 with the screw 202. According to this configuration, the back fixing frame 5 can be fixed first to whichever of the front frame 2 or the rear frame 6 when assembling the liquid crystal display device 1, and hence the assembling sequence of the back fixing frame 5 can be changed easily.

Exemplary Embodiment 3

A liquid crystal display device according to a third exemplary embodiment of the present invention will be described. In the third exemplary embodiment, ventilation holes 2a, 5a are provided at least in the upper and lower faces of the front frame 2 and back fixing frame 5 in the structure of the first exemplary embodiment as shown in FIG. 1. The provision of these ventilation holes 2a, 5a allows heat generated by the CCFL 10 and backlight inverter 12 of the backlight unit 4 to be dissipated outside, and thus the heat dissipation performance of the liquid crystal display device 1 can be improved. Although the arrangement, size, and quantity of the ventilation holes 2a, 5a are not limited particularly, efficient heat dissipation can be realized by arranging the ventilation holes close to the heat generating components or at upper and lower opposing positions with respect to the heat generating components.

Exemplary Embodiment 4

A liquid crystal display device according to a fourth exemplary embodiment of the present invention will be described. In the third exemplary embodiment above, the ventilation holes 2a are formed in a member located on the outer periphery side of the liquid crystal display device (herein the front frame 2) and the ventilation holes 5a are formed in a member located on the inner side thereof (herein the back fixing frame 5). In the fourth exemplary embodiment, the ventilation holes 2a are arranged over a wider range than the ventilation holes 5a. This prevents the ventilation holes being blocked due to misalignment in the assembly of the liquid crystal display device, and the heat dissipation performance of the liquid crystal display device 1 can be reliably improved.

Exemplary Embodiment 5

Figure 6:
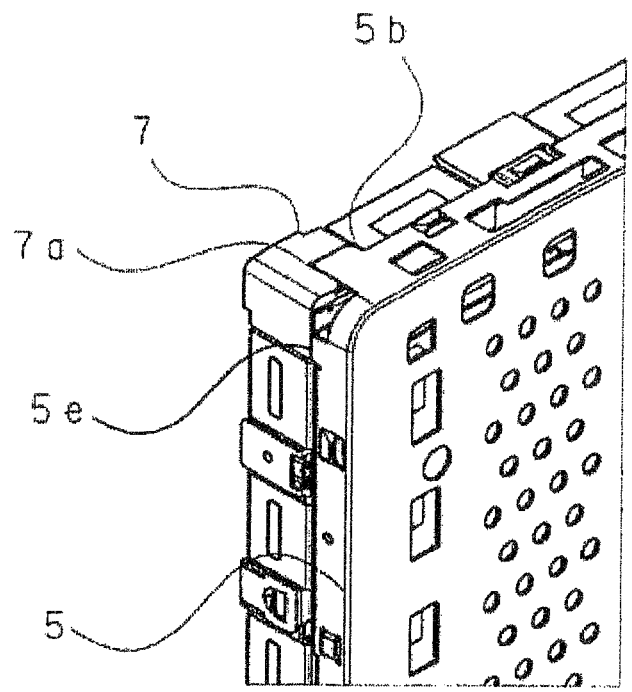
FIG. 6 is a partially enlarged view of a liquid crystal display device according to a fifth and thirteenth exemplary embodiment of the present invention.

A liquid crystal display device according to a fifth exemplary embodiment of the present invention will be described with reference to FIG. 6. FIG. 6 is a partially enlarged view showing the liquid crystal display device according to the fifth exemplary embodiment.

In the fifth exemplary embodiment, the back fixing frame 5 and the backlight chassis 7 in the structure according to the first to fourth exemplary embodiments are provided with positioning protrusions 5b and positioning recesses 7a, respectively, as shown in FIG. 6. The provision of these positioning protrusions 5b and positioning recesses 7a enables accurate positioning between the back fixing frame 5 and the backlight chassis 7 when assembling. This improves the workability and enables the back fixing frame 5 to be fixed at an appropriate position.

Exemplary Embodiment 6

Figure 7:
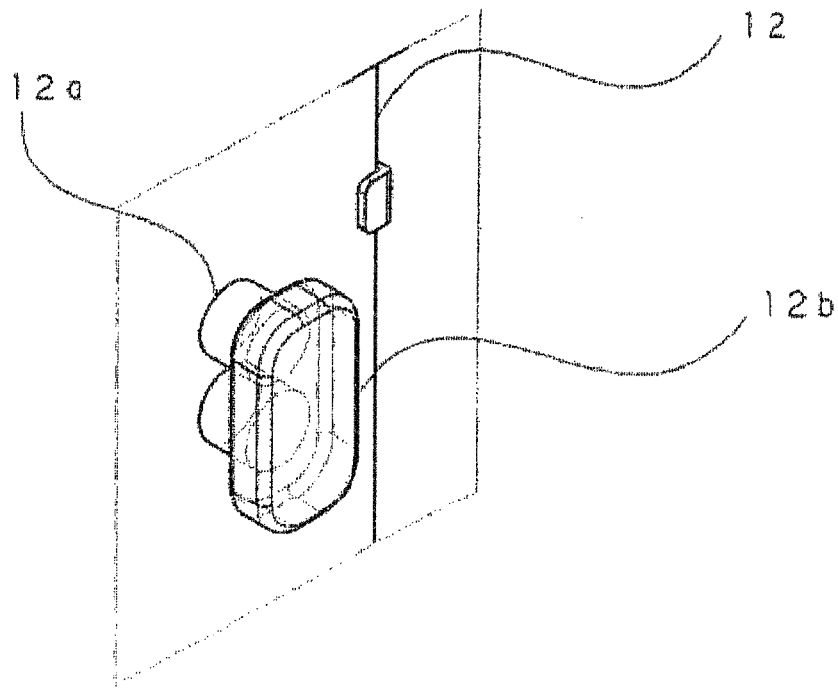
FIG. 7 is a partially enlarged view of a backlight inverter according to a sixth exemplary embodiment of the present invention.

A liquid crystal display device according to a sixth exemplary embodiment of the present invention will be described with reference to FIG. 7. FIG. 7 is a partially enlarged view of a backlight inverter.

According to the sixth exemplary embodiment, as shown in FIGS. 1 and 7, a heat conductive material 12b formed of a metal, carbon, or metal-containing rubber having high heat conductivity is interposed between the back fixing frame 5 and a heat generating component 12a mounted on the backlight inverter 12 in the structure according to the first to fifth exemplary embodiments. The interposition of the heat conductive material 12b between the heat generating component 12a and the back fixing frame 5 enables heat conduction from the heat generating component 12a to the back fixing frame 5, and thereby the heat generated by the heat generating component 12a can be efficiently dissipated outside.

Exemplary Embodiment 7

Figure 8:
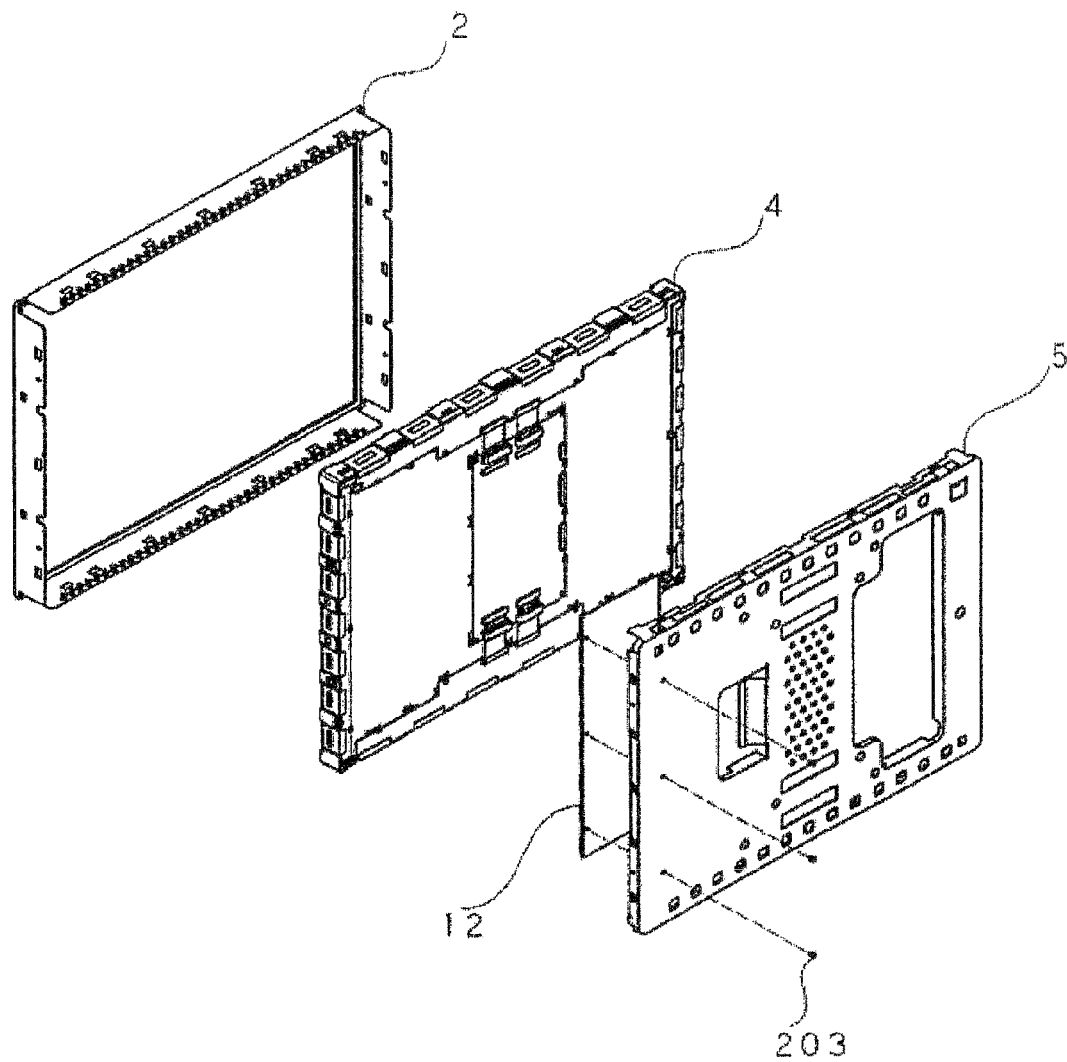
FIG. 8 is an exploded view showing construction of a liquid crystal display device according to a seventh exemplary embodiment of the present invention.

A seventh exemplary embodiment of the present invention will be described with reference to FIG. 8. FIG. 8 is an exploded view showing construction of a liquid crystal display device according to the seventh exemplary embodiment.

Whereas the backlight inverter 12 is fixed to the rear frame 6 of the backlight unit 4 in the first exemplary embodiment above, the backlight inverter 12 is attached to the back fixing frame 5 with the use of a backlight inverter attachment screw 203 in this exemplary embodiment, as shown in FIG. 8. This configuration enables the back fixing frame 5 to function as a heat dissipating plate, and thus heat generated by the heat generating component 12a can be efficiently dissipated outside.

Exemplary Embodiment 8

An eighth exemplary embodiment of the present invention will be described. According to the eighth exemplary embodiment, as shown in FIG. 1, the back fixing frame 5 and the front frame 2 in the structure according to the first exemplary embodiment are respectively provided with fitting portions 2b and fitting portions 5c to mechanically connect the back fixing frame 5 with the front frame 2. The provision of these fitting portions 2b and fitting portions 5c enables the back fixing frame 5 to be accurately positioned to the front frame 2 even when the back fixing frame 5 is fixed to the rear frame 6 before fixing to the front frame 2.

Exemplary Embodiment 9

Figure 9:
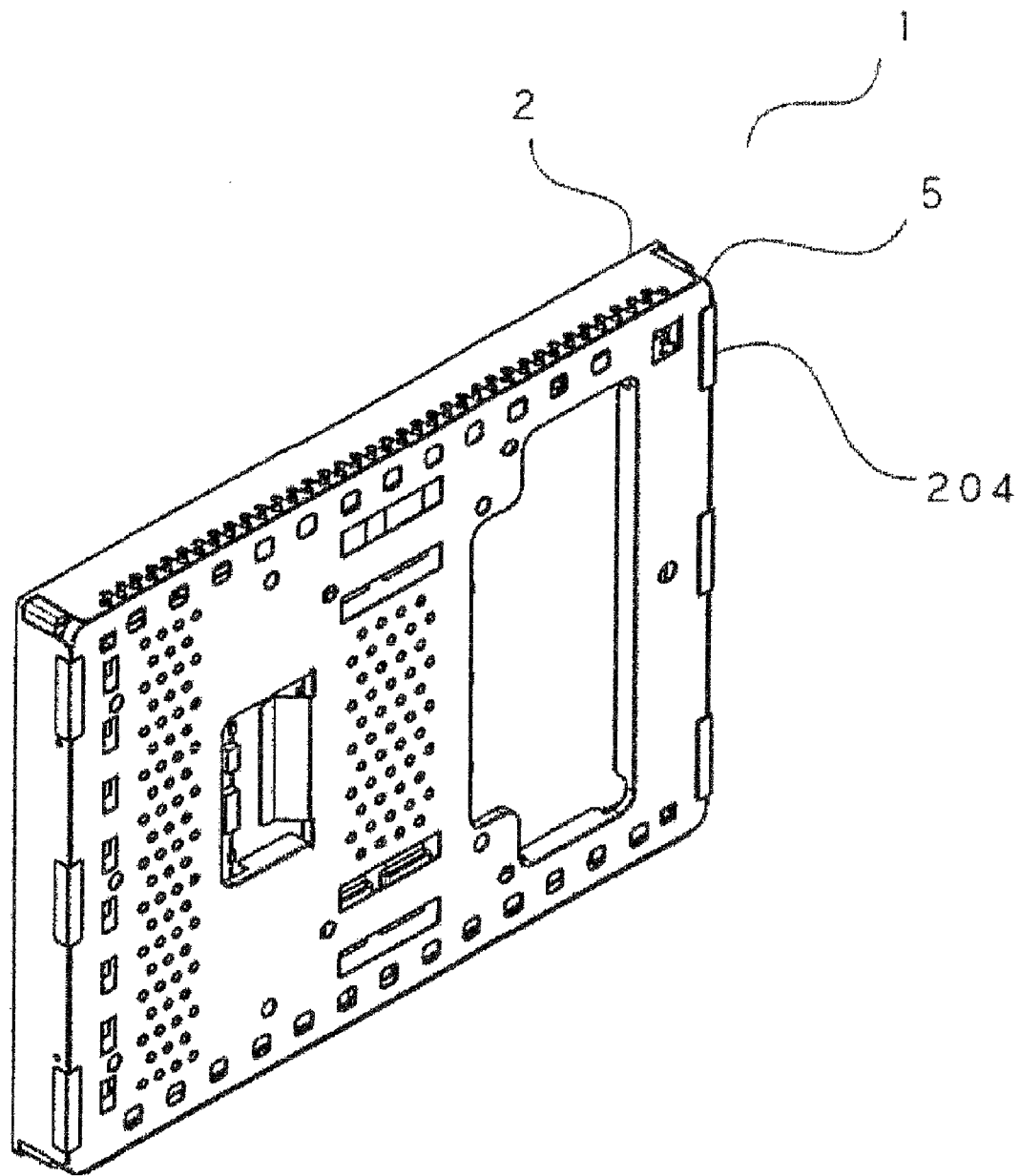
FIG. 9 is an external view showing a structure of a liquid crystal display device according to a ninth exemplary embodiment of the present invention.

A liquid crystal display device according to a ninth exemplary embodiment of the present invention will be described with reference to FIG. 9. FIG. 9 is an external view showing a structure of the liquid crystal display device according to this exemplary embodiment.

According to the ninth exemplary embodiment, as shown in FIG. 9, the back fixing frame 5 and the front frame 2 are mechanically connected and fixed to each other by bonding a back fixing frame mounting tape 204 or the like. The employment of this fixing method makes it possible to simplify the structure of the back fixing frame 5 and the front frame 2, and to reduce the load exerted on the front frame 2, the backlight chassis 7, and the rear frame 6 even if the back fixing frame 5 is deformed.

Exemplary Embodiment 10

Figure 10:
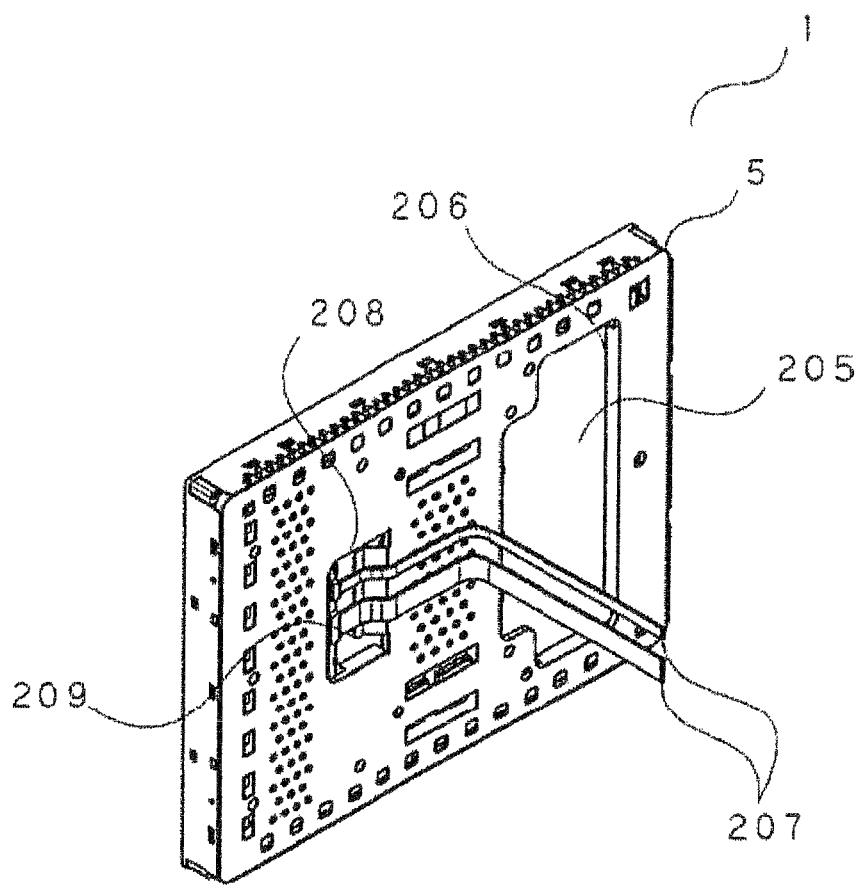
FIG. 10 is an external view showing a structure of a liquid crystal display device according to a tenth and eleventh exemplary embodiment of the present invention.

A liquid crystal display device according to a tenth exemplary embodiment of the present invention will be described with reference to FIG. 10. FIG. 10 is an external view showing a structure of the liquid crystal display device according to this exemplary embodiment.

According to the tenth exemplary embodiment, as shown in FIG. 10, the back fixing frame 5 is formed with an opening 205 to expose the signal processing board 13 and to thereby facilitate the connection of the liquid crystal display device 1 with external equipment. Further, a bent portion 206 is provided at an end face of the opening 205 to increase the section modulus is increased and to prevent reduction of the strength due to the provision of the opening 205.

The section modulus is univocally determined based on a cross-sectional shape of the back fixing frame. Specifically, the section modulus is obtained by dividing a cross-sectional secondary moment about an axis passing the centroid of the cross section of the back fixing frame by a maximum distance from the axis to the periphery of the cross section of the back fixing frame. The centroid means a position at which the cross-sectional primary moment about an arbitrary axis passing a point becomes zero. The cross-sectional secondary moment represents a value obtained by subdividing the cross section of the back fixing frame into minute areas, and multiplying each of the minute areas by the square of a distance to the axis, and summing up all the products thus obtained for the entire cross-sectional area.

Exemplary Embodiment 11

A liquid crystal display device according to an eleventh exemplary embodiment of the present invention will be described. According to the eleventh exemplary embodiment, as shown in FIG. 10, a cable connection hole 208 is formed in the structure of the tenth exemplary embodiment shown in FIG. 10 so that a cable 207 passes through the cable connection hole 208 to be connected to the backlight inverter 12 or the like. The connection between the liquid crystal display device 1 and external equipment is thus made easier by the provision of this hole. Further, a slope 209 is formed in a part of the cable connection hole 208 to facilitate the leading-out of the cable 207 and to prevent disconnection of the cable 207.

Exemplary Embodiment 12

Figure 11:
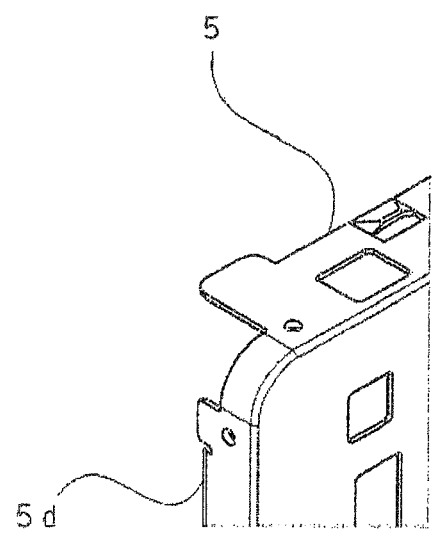
FIG. 11 is a partially enlarged view of a liquid crystal display device according to a twelfth exemplary embodiment of the present invention.

A liquid crystal display device according to a twelfth exemplary embodiment of the present invention will be described with reference to FIG. 11. FIG. 11 is a partially enlarged view of a liquid crystal display device according to this exemplary embodiment.

When the back fixing frame 5 is attached, in the assembling process of the liquid crystal display device 1 shown in FIG. 1, to a semi-assembly in which the front frame 2, the liquid crystal panel 3, and the backlight unit 4 have already been assembled, the back fixing frame 5 is inserted into the front frame 2. In the twelfth exemplary embodiment, as shown in FIG. 11, a tapered portion 5d is formed in a part of the back fixing frame 5, whereby it is made easier to insert the back fixing frame 5 into the front frame 2.

Exemplary Embodiment 13

A liquid crystal display device according to a thirteenth exemplary embodiment of the present invention will be described. In the thirteenth exemplary embodiment, as shown in FIG. 6, an abutting portion 5e is provided in a member of the backlight unit (in the backlight chassis 7 in the structure shown in FIG. 6) so that, when the back fixing frame 5 is inserted into the front frame 2, the back fixing frame 5 is prevented from being inserted too far. The provision of the abutting portion 5e improves the assembling workability, and makes it possible to fix the back fixing frame 5 at an appropriate position.

Exemplary Embodiment 14

A liquid crystal display device according to a fourteenth exemplary embodiment of the present invention will be described. As shown in FIG. 1, the back face of the backlight unit 4 becomes invisible when the back fixing frame 5 is attached. According to this exemplary embodiment, therefore, a checking hole 5f is formed in the back fixing frame 5 so that the backlight inverter 12, the signal processing board 13 and other members in the back fixing frame 5 can be checked visually. The provision of the checking hole 5f makes it possible to assemble while checking the arrangement of the members, resulting in improvement in assembling workability.

Exemplary Embodiment 15

Figure 12:
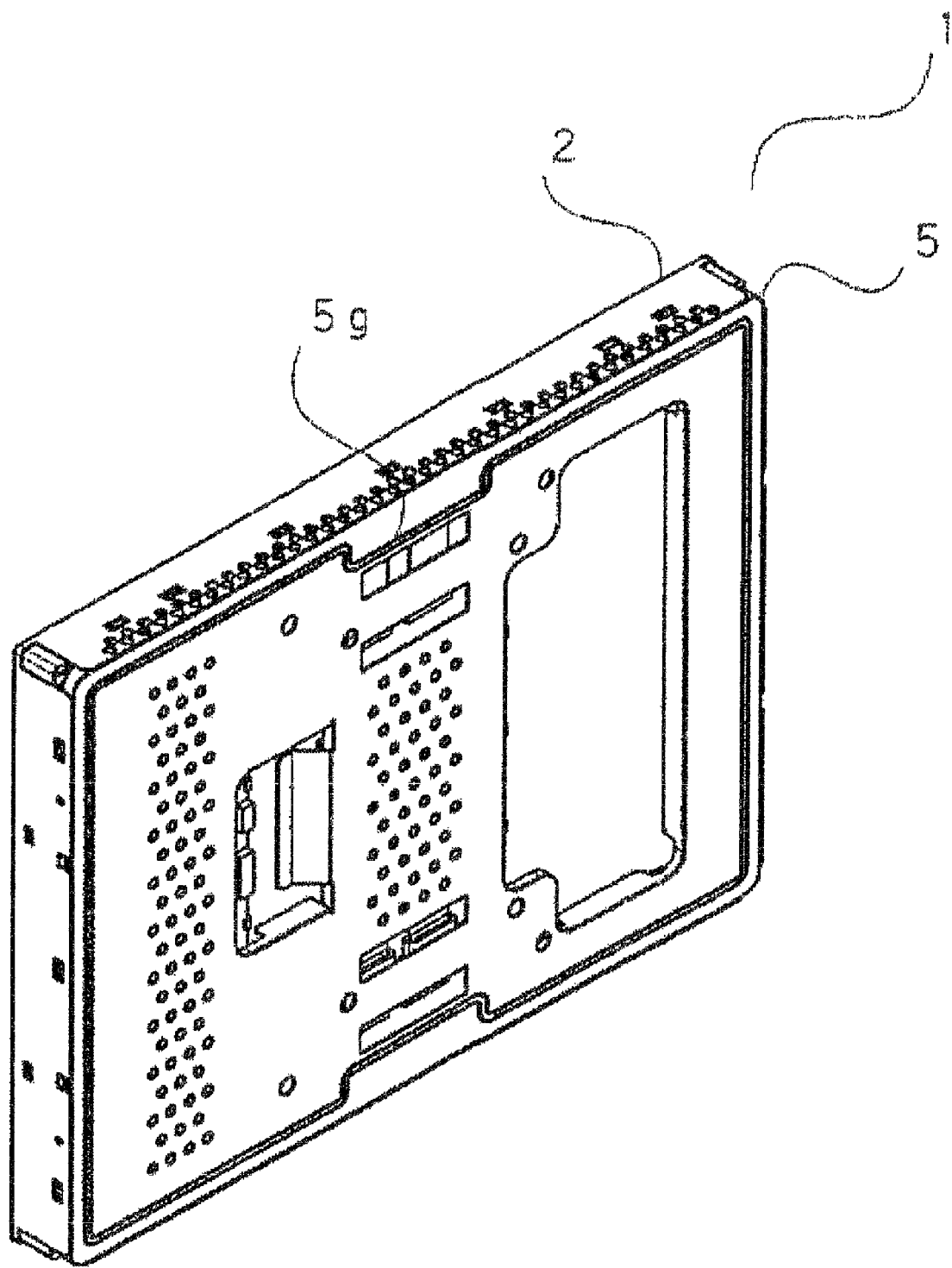
FIG. 12 is an external view of a liquid crystal display device according to a fifteenth exemplary embodiment of the present invention.

A liquid crystal display device according to a fifteenth exemplary embodiment of the present invention will be described with reference to FIG. 12. FIG. 12 is an external view showing a structure of a liquid crystal display device according to this exemplary embodiment.

As shown in FIG. 12, when the back fixing frame 5 is formed from sheet metal, the back fixing frame 5 may be short in strength depending on thickness, shape and quality of the material. According to the fifteenth exemplary embodiment, therefore, a drawn portion 5g is formed at a predetermined position of the back fixing frame 5 (for example, at a substantially central position along a long side of the rectangular shape of the frame 5). The provision of the drawn portion 5g improves the section modulus and hence improves the strength of the back fixing frame 5.

Description has been made of the exemplary embodiments of the present invention, which provides a liquid crystal display device having, at least, a front frame located on the display screen side, a liquid crystal panel, and a backlight unit having at least a rear frame on the back face side, arranged in this order. The liquid crystal display device is further provided with a back fixing frame on the back side thereof to be connected with the front frame, and the back fixing frame has a attachment portion to be attached to an external chassis. According to the present invention, external force generated by connection with the external chassis is made less transmittable to the liquid crystal panel or the backlight unit, and thus deformation of the liquid crystal panel and the reflection sheet can be prevented.

More specifically, a threaded portion is provided in a side face of the back fixing frame as an attachment portion, eliminating the need of providing an attachment portion in the backlight chassis forming the backlight unit on which the liquid crystal panel is to be mounted. This makes it possible to reduce the transmission of external force possibly deforming the plane on which the liquid crystal panel is mounted.

Further, a threaded portion may be provided on the back face of the back fixing frame as an attachment portion, eliminating the need of providing an attachment portion in the rear frame forming the backlight unit. In this case, no external force is transmitted to the rear frame, eliminating the effect to the flatness of the reflection sheet disposed in the inside of the rear frame for reflecting light from a light source to the liquid crystal panel. As a result, the luminance uniformity can be reliably obtained in the backlight unit.

Although the descriptions of the exemplary embodiments have been made in terms of a case in which the configuration of the present invention is applied to a liquid crystal display device, the present invention is not limited to these exemplary embodiments, and is also applicable to any other display devices such as organic EL (electroluminescence) display devices.

The present invention is applicable to a liquid crystal display device and any other display devices.

What is claimed is:

1. A liquid crystal display device comprising:
a front frame;
a liquid crystal panel; and
a backlight unit having a rear frame, the backlight unit comprising a backlight chassis adapted to form a side frame of the backlight unit, the backlight chassis and the rear frame forming an outer case of the backlight unit and enclosing an optical sheet, a light source held by a light source support, and a reflection sheet in this sequence from a side of the liquid crystal panel, an end portion of the rear frame being bent from a main portion towards the liquid crystal panel and being coupled along the side frame of the backlight unit,
wherein the front frame, the liquid crystal panel and the backlight unit are arranged in this sequence:
the front frame is attached from a display screen side of the liquid crystal panel to hold the entire liquid crystal panel and the back light unit, and
a back fixing member having a side face and a back face formed thereon is provided behind the rear frame of the backlight unit to fix the side face of the back fixing member to a side face of the front frame without being fixed to the rear frame of the backlight unit in such a manner that the back face of the back fixing member is spaced apart from the rear frame of the backlight unit, and the back fixing member is provided with an attachment portion having at least one threaded hole to be attached to an external chassis to which the liquid crystal display device is to be fixed.

2. The liquid crystal display device according to claim 1, wherein the back fixing member is designed to be fixable also to the rear frame.

3. The liquid crystal display device according to claim 1, wherein the back fixing member and at least one of the front frame, the backlight chassis and the rear frame are respectively provided with fitting portions to be fitted with each other, or abutting portions to be engaged with each other, and the back fixing member are positioned by means of the fitting portions or the abutting portions.

4. The liquid crystal display device according to claim 1, wherein the back fixing member is in contact with an inner side face of the front frame, and the front frame is provided with a through hole at a position corresponding to the attachment portion, the trough hole being greater than the attachment portion.

5. The liquid crystal display device according to claim 1, wherein a plurality of ventilation holes are provided at corresponding positions of the front frame and the back fixing member, and heat generated by the liquid crystal display device is dissipated outside through the ventilation holes.

6. The liquid crystal display device according to claim 1, wherein the back fixing member is in contact with a heat generating component mounted on the back face of the backlight unit with a heat conductive member interposed therebetween, and heat generated by the heat generating component is dissipated outside from the back fixing member through the heat conductive member.

7. A liquid crystal display device comprising:
a liquid crystal panel;
a backlight unit comprising a backlight chassis adapted to form a side frame of the backlight unit and a rear frame, the backlight chassis and the rear frame forming an outer case of the backlight unit and enclosing an optical sheet, a light source held by a light source support, and a reflection sheet in this sequence from a side of liquid crystal panel, an end portion of the rear frame being bent from a main portion towards the liquid crystal panel and being coupled along the side frame of the backlight unit; and
a front frame mounted from the display screen side of the liquid crystal panel and connected with the backlight unit,
wherein a back fixing member having a side face and a back face formed thereon is provided behind the rear frame of the backlight unit to fix the side face of the back fixing member to a side face of the front frame without being fixed to the rear frame of the backlight unit in such a manner that the back face of the back fixing member is spaced apart from the rear frame of the backlight unit, and an attachment portion having at least one threaded hole is provided in at least either the side faces or the back face of the back fixing member to be attached to an external chassis to which the liquid crystal display device is to be fixed.

8. The liquid crystal display device according to claim 7, wherein the back fixing member is designed to be fixable also to the rear frame.

9. The liquid crystal display device according to claim 7, wherein the back fixing member and at lest one of the front frame, the backlight chassis and the rear frame are respectively provided with fitting portions to be fitted with each other, or abutting portions to be engaged with each other, and the back fixing member are positioned by means of the fitting portions or the abutting portions.

10. The liquid crystal display device according to claim 7, wherein the back fixing member is in contact with an inner side face of the front frame, and the front frame is provided with a through hole at a position corresponding to the attachment portion, the trough hole being greater than the attachment portion.

11. The liquid crystal display device according to claim 7, wherein a plurality of ventilation holes are provided at corresponding positions of the front frame and the back fixing member, and heat generated by the liquid crystal display device is dissipated outside through the ventilation holes.

12. The liquid crystal display device according to claim 7, wherein the back fixing member is in contact with a heat generating component mounted on the back face of the backlight unit with a heat conductive member interposed therebetween, and heat generated by the heat generating component is dissipated outside from the back fixing member through the heat conductive member.

13. A display device comprising:
a front frame;
a display panel; and
a backlight unit having a rear frame, the backlight unit comprising a backlight chassis adapted to form a side frame of the backlight unit, the backlight chassis and the rear frame forming an outer case of the backlight unit and enclosing an optical sheet, a light source held by a light source support, and a reflection sheet in this sequence from a side of the display panel, an end portion of the rear frame being bent from a main portion towards the display panel and being coupled along the side frame of the backlight unit, wherein the front frame, the display panel and the backlight unit are arranged in this sequence:

the front frame is attached from a display screen side of the display panel to hold the entire display panel and the back light unit, and a back fixing member having a side face and a back face formed thereon is provided behind the rear frame of the backlight unit to fix the side face of the back fixing member to a side face of the front frame without being fixed to the rear frame of the backlight unit in such a manner that the back face of the back fixing member is spaced apart from the rear frame of the backlight unit, and the back fixing member is provided with an attachment portion having at least one threaded hole to be attached to an external chassis to which the display device is to be fixed.

14. The display device according to claim 13, wherein the back fixing member and at least one of the front frame, the backlight chassis and the rear frame are respectively provided with fitting portions to be fitted with each other, or abutting portions to be engaged with each other, and the back fixing member are positioned by means of the fitting portions or the abutting portions.

15. The display device according to claim 13, wherein the back fixing member is in contact with an inner side face of the front frame, and the front frame is provided with a through hole at a position corresponding to the attachment portion, the through hole being greater than the attachment portion.

16. The display device according to claim 13, wherein a plurality of ventilation holes are provided at corresponding positions of the front frame and the back fixing member, and heat generated by the display device is dissipated outside through the ventilation holes.

17. The display device according to claim 13, wherein the back fixing member is in contact with a heat generating component mounted on the back face of the backlight unit with a heat conductive member interposed therebetween, and heat generated by the heat generating component is dissipated outside from the back fixing member through the heat conductive member.

18. The display device according to claim 13, wherein the display device is a liquid crystal display device or an organic electroluminescence display device.

* * * * *